Patented Nov. 5, 1935

2,019,850

UNITED STATES PATENT OFFICE 2,019,850

SELENIUM CONTAINING ANTHRAQUINONE COMPOUNDS

Ivan Gubelmann, Wilmington, Del., and William L. Rintelman, Carrollville, Wis., assignors to E. I. du Pont de Nemours and Company, Wilmington, Del., a corporation of Delaware No Drawing. Application March 23, 1934, Serial No. 717,082

6 Claims. (Cl. 260—44)

This invention relates to the preparation of new selenium containing anthraquinone compounds and more particularly to the preparation of C-diaryl-anthraquinone diselenazoles of the general formula:

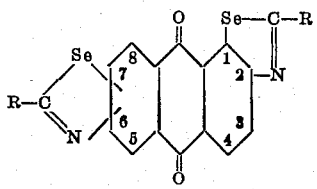

in which the second selenazole ring is attached in either the 5,6 or the 8,7 position, and R represents an aryl radical. The compounds are valuable as vat dyestuffs, dyeing cotton greenish yellow to orange shades fast to light, washing and bleach.

We have found that these compounds may be prepared in several ways, among which may be listed the following:

(1) Heating the 2,6 or 2,7-bis-aryl-chloromethylimino-anthraquinones with selenium powder in a high boiling solvent in the presence of anhydrous quinoline as an acid binding agent.

(2) Treating the 2,6 or 2,7-bis-aryl-chloromethylimino-anthraquinone with sodium hydroselenide in alcoholic solution at an elevated temperature.

(3) Treating the anthraquinone-1,5-dichloro-2,6-bis-phenyl-chloro-methylimino body with selenium powder in a high boiling solvent capable of furnishing hydrogen.

(4) Treating the anthraquinone-1,5-dichloro-2,6-bis-aryl-chloro-methylimino body with an alcoholic solution of sodium selenide.

(5) Treating the anthraquinone-1,5-dichloro-2,6-bis-aryl-chloro-methylimino body with selenium powder in alcohol (under pressure) at elevated temperatures, using lime as an acid binding agent.

(6) Treating the aroyl ester of 1,5-dihydroselenide-2,6-diamino-anthraquinone at elevated temperatures to effect ring-closure.

In the following examples these methods are illustrated in connection with the preparation of various aryl substituted anthraquinone selenazoles, it being understood that the several methods are applicable for the preparation of this class of selenazoles generally and are not to be limited to the preparation of the compounds prepared in the particular example in which that process is illustrated.

Example 1

1 part of 2,6-bis-phenyl-chloro-methyliminoanthraquinone having the probable formula:

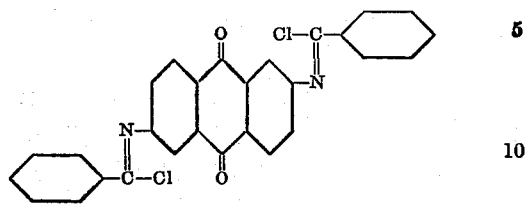

(obtained as yellowish needles melting at 264–266° C. (corrected) by treating 2,6-bis-benzoyl-diamino-anthraquinone with phosphorus pentachloride) is heated with 5 parts of naphthalene, 1 part of anhydrous quinoline and ½ part of selenium powder under a reflux condenser until no imide chloride remains. The naphthalene and quinoline are removed by hot extraction with an organic solvent, such as dichlorobenzene.

The product remains behind in the form of large slender yellow needles. It is insoluble in cold organic solvents but dissolves in concentrated sulfuric acid, imparting to it a yellow color, from which it may be precipitated by reducing the concentration of the acid below 90%. By this procedure purification of the product may be effected. It dyes cotton from a blue-violet vat strong reddish-yellow shades of excellent fastness properties. The product is slightly soluble in boiling alpha-monochloro-naphthalene from which it crystallizes on cooling in long slender yellow needles. Analysis of the product, after recrystallizing it twice from 90% sulfuric acid, shows it to be C-diphenyl-1,2;5,6-anthraquinone diselenazole having the probable formula:

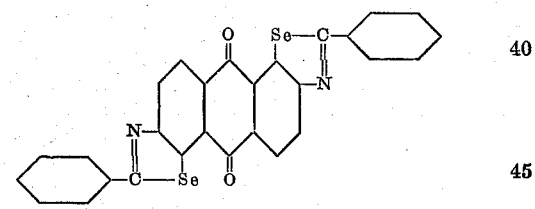

Example 2

19.2 parts of selenium are suspended in 300 parts of ethyl alcohol and under good agitation. 11.5 parts of metallic sodium are slowly added, the reaction mass being allowed to come to a boil. When formation of the sodium selenide is complete, the solution is cooled to 0–10° C. and at this temperature 12.2 parts of 100% sulfuric acid (mixed with 50 parts of ethyl alcohol) are slowly added, exercising caution to prevent loss of hydrogen selenide gas. 25 parts of 2,6-bis-phenyl-chloro-methylimino-anthraquinone are added and the whole heated in an autoclave at 145-150° C. for 12 hours. The cooled reaction mass is then filtered and the brown insoluble precipitate treated with hot hypochlorite liquor to oxidize the excess selenium and brighten the product. It may be further purified by dissolving in 100% sulfuric acid and then reducing the concentration of the acid to 80-90% by the slow addition of water and filtering off the product, which is similar in all respects to that obtained in Example 1.

*Example 3*

13.4 parts of 2,7-bis-phenyl-chloro-methylimino-anthraquinone, obtained as yellow needles melting at 163-172° C. when 2,7-bis-benzoyl-amino-anthraquinone is treated with phosphorus pentachloride (in dichlorobenzol), are heated with 50 parts of anhydrous quinoline and 5 parts of selenium powder under a reflux condenser for four hours, diluted with 100 parts of ortho-dichlorobenzol and filtered at 50° C. The C-diphenyl-1,2;8,7-anthraquinone diselenazole remains behind in the form of yellow needles. The product is soluble in boiling quinoline and other high boiling organic solvents. It dissolves in concentrated sulfuric acid with a red brown color from which it precipitates as a finely divided yellow body on dilution with water. It dyes cotton fast yellow shades from a blue vat.

*Example 4*

20 parts of 2,6-bis-phenyl-chloro-methylimino-1,5-dichloro-anthraquinone (obtained as yellow crystals (M. P. 279-281° C. corrected) when bis-benzoyl- 2,6-diamino-1,5-dichloro-anthraquinone is treated with phosphorus pentachloride in an inert solvent), 200 parts of tetralin, 10 parts of sodium bisulfite and 6.5 parts of selenium powder are heated under a reflux condenser for eighteen hours. The tetralin is removed by filtration. The greenish-yellow powder remaining is freed from inorganic salts and selenium by treatment with boiling water followed by hot hypochlorite liquor. The resulting dyestuff is similar in all respects to that obtained in Example 1.

*Example 5*

The same conditions are used as in Example 4, using kerosene (boiling point 210-220° C.) in place of tetralin. The product is the same as obtained in Example 1.

*Example 6*

30 parts of 2,6-bis-phenyl-chloro-methylimino-1,5-dichloro-anthraquinone, 375 parts of methyl alcohol, 15 parts of hydrated lime, 10 parts of selenium powder and 1.5 parts of verdigris are heated together in an autoclave at 180° C. for eighteen hours. The final reaction mass is cooled, diluted with water and filtered. The greenish-yellow precipitate is then treated with hot hypochlorite liquor to effect purification. The product is substantially the same as obtained in Example 1.

*Example 7*

7.8 parts of selenium powder are suspended in 250 parts of 90% ethyl alcohol and with rapid agitation 4.6 parts of metallic sodium are slowly added, the temperature being allowed to rise to the boiling point of the alcohol. The solution becomes redder as the selenium is dissolved. 25 parts of 2,6-bis-phenyl-chloro-methylimino-1,5-dichloro-anthraquinone are now added and the whole heated under a reflux for 6 hours. The color of the reaction mass changes from red to brown with the formation of a brown precipitate. The C-diphenyl-1,2;5,6-anthraquinone-diselenazole may be obtained in a purer state by hot hypochlorite treatment followed by precipitation from 85% sulfuric acid.

*Example 8*

25 parts of 2,6-bis-para-tolyl-chloro-methylimino-anthraquinone (obtained as yellow needles melting at 242-248° C. (uncorrected) when 2,6-bis-para-toluoyl-diamino-anthraquinone is treated with phosphorus pentachloride in an inert solvent) are heated with 125 parts of naphthalene, 9 parts of selenium powder, and 25 parts of anhydrous quinoline under reflux until no imide chloride remains. The naphthalene and quinoline are removed by extraction with an organic solvent. The C-di-para-tolyl-1,2,5,6-anthraquinone-diselenazole remains behind in the form of brownish crystals insoluble in organic solvents, but soluble in concentrated sulfuric acid with a yellow coloration. It dyes cotton in reddish-yellow shades from a red-violet vat of excellent fastness properties.

*Example 9*

12 parts of 2,6-bis-beta-naphthyl-chloro-methylimino-anthraquinone (obtained as yellow crystals melting at 248-259° C. when 2,6-bis-beta-naphthoyl-amino-anthraquinone is treated with phosphorus pentachloride in an inert solvent) are heated with 60 parts of naphthalene, 10 parts of anhydrous quinoline, and 3.5 parts of selenium powder under a reflux condenser for twenty hours. The naphthalene and quinoline are removed by extraction with a hot organic solvent. The C-di-beta-naphthyl-1,2,5,6-anthraquinone diselenazole remains behind in the form of a brown crystalline powder insoluble in organic solvents but soluble in concentrated sulfuric acid with a reddish-brown coloration from which it precipitates as a reddish-brown gelatinous suspension on pouring into a large volume of water. The product dyes cotton yellow-orange shades from a violet colored vat.

*Example 10*

11.6 parts of 2,6-bis(para-chloro-phenyl)-chloro-methylimino-anthraquinone (obtained as pale yellow needles melting at 286-295° C. when 2,6-bis-para-chloro-benzoyl-amino-anthraquinone is treated with phosphorus pentachloride in an inert solvent) are heated in 60 parts of naphthalene, 10 parts of anhydrous quinoline and 7 parts of selenium powder until no imide chloride remains. The naphthalene and quinoline are removed by extraction with hot organic solvents. The dichloro-phenyl-diselenazole remains behind as a yellow crystalline powder insoluble in most organic solvents and soluble in concentrated sulfuric acid with a yellow color. It dyes cotton in reddish-yellow shades from a violet colored vat.

*Example 11*

10 parts of anthraquinone-2,6-diamino-1,5-dihydro-selenide (obtained by heating 1,5-dichloro-2,6-diamino-anthraquinone in an alcoholic solution of sodium poly-selenide or hydroselenide in slight excess until the chlorine has been removed, filtering off the violet colored solution and precipitating the hydroselenide with sodium bisulfite) are suspended in 200 parts of water, 10 parts of sodium sulfide crystals are added and warmed to 60–70° C. To the violet colored solution, 10 parts of benzoyl chloride are slowly added with good agitation. The brown precipitate, probably 1,5-seleno-benzoyl ester 2,6-diamino-anthraquinone, is filtered off and washed with water and alcohol. The dried product is heated in 10 parts of alpha-monochloronaphthalene at 240° C. for 5 to 10 minutes. A brown colored product is formed, which after purification by hypochlorite treatment, followed by crystallization from 85% sulfuric acid, dyes cotton in bright yellow shades from a blue-violet vat. It dissolves in strong sulfuric acid and imparts to it a yellow color. The product is similar in all respects to that obtained in Example 1. Other aroyl chlorides may be used in place of benzoyl chloride in this example, such as anisoyl chloride, naphthoyl chloride, anthraquinonoyl chloride, etc.

Various aryl-chloro-methylimino-anthraquinones may be used to form the corresponding aryl substituted anthraquinone selenazoles, such as phenyl, naphthyl, anthraquinonyl or the simple substitution derivatives thereof. My invention is not limited to the use of any particular aryl substitution products but contemplates broadly the preparation of diselenazoles of the anthraquinone series which may or may not be further substituted in the aryl or anthraquinone nucleus, which have been found to be valuable vat dyestuffs.

In the preparation of these compounds, any inert high boiling solvent may be used which is stable at the temperature of the reaction. In dissolving out the naphthalene, quinoline or other solvent from the reaction mass, various organic solvents for these compounds may be used, such as naphtha, chlorobenzols, etc., in which they are soluble at least in the hot, but in which the diselenazole is relatively insoluble. In those examples where quinoline is used, it may be used as the solvent as well as the acid binding agent, thereby eliminating the use of naphthalene or other solvent if desired. The temperatures at which the reactions are carried out may be varied widely. At lower temperatures the time required for completing the reaction is necessarily increased.

We claim:
1. A C-diaryl-anthraquinone-diselenazole in which the selenazole groups are attached to opposite rings of the anthraquinone nucleus in alpha,beta positions.
2. A C-diphenyl-anthraquinone-diselenazole in which the selenazole groups are attached to opposite rings of the anthraquinone nucleus in alpha,beta positions.
3. In the preparation of a C-diaryl-anthraquinone-diselenazole the step which comprises reacting upon a compound of the group consisting of an alpha,alpha-dichloro-beta,beta-diamino-anthraquinone and a beta,beta-bis-aryl-chloromethylimino-anthraquinone, in which the amine groups are in opposite rings of the anthraquinone nucleus and the chloro atoms are in ortho position relative thereto, with a reagent of the class consisting of selenium and an alkali-metal selenide.
4. In the preparation of C-diaryl-anthraquinone-diselenazoles the step which comprises reacting upon a beta,beta-bis-aryl-chloro-methylimino-anthraquinone wherein the aryl-chloromethylimino groups are in opposite rings of the anthraquinone radical with a reagent of the class consisting of selenium and an alkali-metal selenide.
5. In the preparation of a C-diaryl-anthraquinone-diselenazole the step which comprises reacting upon a beta,beta-bis-aryl-chloromethylimino-anthraquinone wherein the aryl-chloro-methylimino groups are in opposite rings of the anthraquinone radical with selenium in a high boiling inert organic solvent and in the presence of anhydrous quinoline as an acid binding agent.
6. In the preparation of a C-diaryl-anthraquinone-diselenazole, the steps which comprise reacting upon an alpha,alpha-dichloro-beta,beta-diamino-anthraquinone, in which the amino groups are in opposite rings of the anthraquinone nucleus and the chloro atoms are in ortho position relative thereto, with an alkali-metal selenide and condensing the product so formed with an aroyl chloride.

IVAN GUBELMANN.
WILLIAM L. RINTELMAN.